US012804469B2

(12) United States Patent
Diao et al.

(10) Patent No.: US 12,804,469 B2
(45) Date of Patent: Nov. 17, 2026

(54) TRAFFIC TRANSMISSION SCHEMES IN WIRELESS COMMUNICATIONS

(71) Applicant: ZTE Corporation, Shenzhen (CN)

(72) Inventors: Xueying Diao, Shenzhen (CN); Hao Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 240 days.

(21) Appl. No.: 18/476,853

(22) Filed: Sep. 28, 2023

(65) Prior Publication Data

US 2024/0022965 A1 Jan. 18, 2024

Related U.S. Application Data

(63) Continuation of application No. PCT/CN2021/085041, filed on Apr. 1, 2021.

(51) Int. Cl.
*H04W 28/00* (2009.01)
*H04W 28/10* (2009.01)
*H04W 76/18* (2018.01)

(52) U.S. Cl.
CPC ........... *H04W 28/10* (2013.01); *H04W 76/18* (2018.02)

(58) Field of Classification Search
None
See application file for complete search history.

(56) References Cited

U.S. PATENT DOCUMENTS

2021/0051512 A1* 2/2021 Hampel ................ H04W 40/22
2023/0362779 A1* 11/2023 Zhu ....................... H04W 40/06

FOREIGN PATENT DOCUMENTS

CN 110167199 8/2019
CN 111093211 5/2020
CN 111865802 10/2020
EP 4014695 B1 * 9/2023 ............ H04W 40/22
KR 20230042334 A * 3/2023 ............ H04W 76/15
WO 2020/149653 7/2020
WO 2020/167186 8/2020

OTHER PUBLICATIONS

International Search Report and Written Opinion for PCT/CN2021/085041, filed Apr. 1, 2021, Report dated Jan. 4, 2022, 9 pages.
Futurewei "RAN2 impacts of Rel. 17 IAB topology adaptation enhancements" 3GPP TSG-RAN WG2 Meeting #112 electronic R2-2010490, Online, Nov. 2020 Revision R2-2007984, 7 pages.

(Continued)

*Primary Examiner* — Gerald A Smarth
(74) *Attorney, Agent, or Firm* — Ashurst Perkins Coie LLP US

(57) ABSTRACT

Systems, apparatus, and methods of wireless communication are described, and more specifically, to techniques related to traffic transmission schemes for inter-donor redundancy and radio link failure (RLF) scenarios. One example method includes transmitting, from a first network node configured to communicate with a first integrated access and backhaul (IAB) node, to a second network node, a first message including information relating to dual connectivity (DC). The first and second network nodes can each be IAB-donors comprising an IAB-donor central unit (CU) and one or more IAB-donor distributed units (DU).

20 Claims, 9 Drawing Sheets

(56) References Cited

OTHER PUBLICATIONS

First Examination Report for co-pending IN Appl. No. 202317065314, Report dated Mar. 3, 2025, 4 pages.
Extended European Search Report for co-pending EP Appl. No. 21 934 005.6, Report dated Apr. 4, 2024, 13 pages.
Zte, et al. "Discussion on inter-donor redundancy" 3GPP TSG-RAN WG3 #110-e Nov. 2-12, 2020, R3-206562 5 pages.
Zte, et al. "Discussion on inter-Donor IAB Node Migration procedure" 3GPP TSG-RAN WG3 Meeting #110-e, Nov. 2-12, 2020, R3-206559, 11 pages.
Nokia, et al. "Discussion on Inter-CU topology redundancy" 3GPP TSG-RAN WG3 Meeting #110-e Nov. 2-12, 2020, R3-206289, 5 pages.
Samsung "Discussion on inter-donor topology redundancy for IAB" 3GPP TSG-RAN WG3 #110-e, R3-206002, Nov. 2-12, 2020, 4 pages.
Office Action for co-pending Korean Patent Application No. 10-2023-7033888, dated Apr. 30, 2026, 20 pages with unofficial English translation.
Hearing Notice for co-pending Indian Patent Application No. 202317065314, dated Jun. 24, 2026, 2 pages.
First Office Action for co-pending Chinese Appl. No. 202180097804.6, Office action dated Jul. 18, 2026, 26 pages with Google translation.

* cited by examiner

TRAFFIC TRANSMISSION SCHEMES IN WIRELESS COMMUNICATIONS

CROSS-REFERENCE TO RELATED APPLICATION

This application is a continuation and claims priority to International Application No. PCT/CN2021/085041, filed on Apr. 1, 2021, the disclosure of which is hereby incorporated by reference herein in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for traffic transmission schemes in wireless communications.

In one exemplary aspect, a wireless communication method is disclosed. The wireless communication method includes transmitting, from a first network node configured to communicate with a first integrated access and backhaul (IAB) node, to a second network node, a first message including information relating to dual connectivity (DC).

In another exemplary aspect, a wireless communication method is disclosed. The wireless communication method includes receiving, from a first integrated access backhaul (IAB) node at a second IAB node, an indication including one or more routing IDs associated with a radio link failure (RLF). The method also includes performing an action based on the indication.

In another exemplary aspect, a wireless communication method is disclosed. The wireless communication method includes receiving, at an integrated access and backhaul (IAB) node from a first central unit (CU), a mapping rule. The method also includes changing a first routing ID in a backhaul adaptation protocol (BAP) protocol data unit (PDU) to a second routing ID based on the mapping rule.

In another exemplary aspect, a wireless communication apparatus comprising a processor configured to perform the disclosed methods is disclosed.

In another exemplary aspect, a computer readable medium having code stored thereon is disclosed. The code, when implemented by a processor, causes the processor to implement a method described in the present document.

These, and other features, are described in the present document.

DETAILED DESCRIPTION

The disclosed technology provides implementations and examples of signaling exchange schemes in wireless communications. Some implementations of the disclosed technology provide signaling interaction between donors and IAB nodes when IAB nodes perform dual connections.

Compared with Long Term Evolution (LTE), New Radio (NR) has a larger available bandwidth, and the use of massive multiple-input and multiple-output (MIMO) and multi-beam makes it possible to research and apply integrated access and backhaul links (IAB). Through wireless backhaul links and relay links, dense NR cell networks can be deployed more flexibly without correspondingly increasing the dense deployment of transmission networks.

Figure 1:
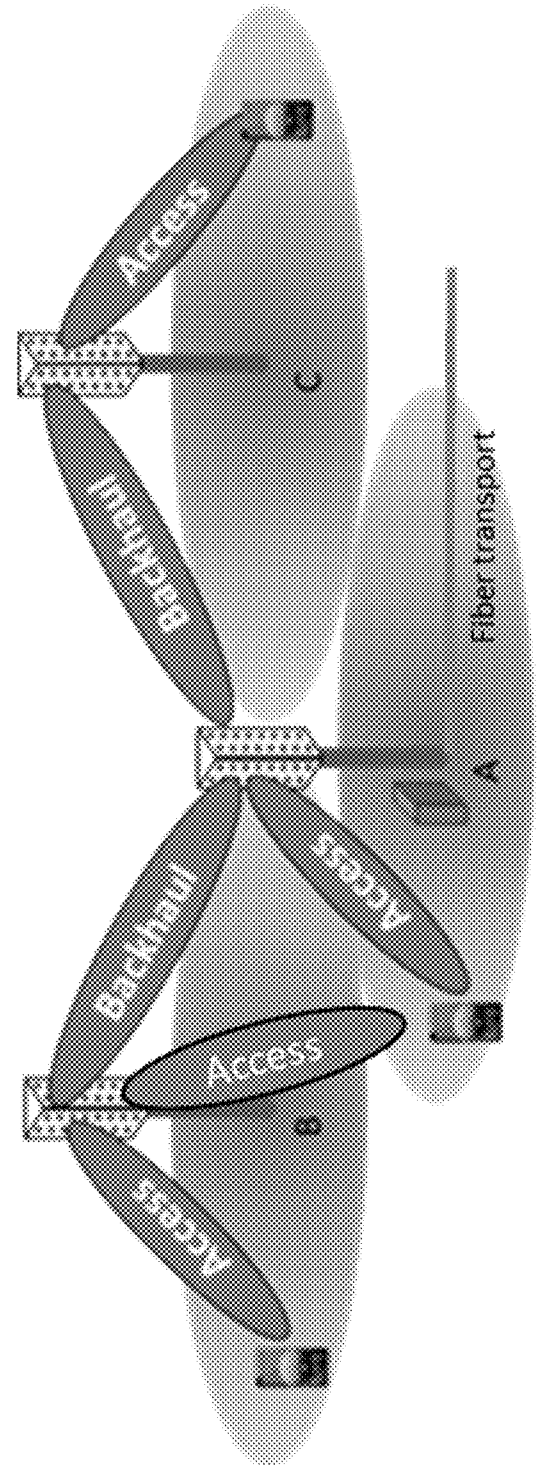
FIG. 1 shows an example of a network deployed with integrated access and backhaul links.

An example of a network deployed with integrated access and backhaul links is shown in FIG. 1. In FIG. 1, A, B, and C are all access nodes, and user equipment can access the access nodes A, B, C through the access link. There is only a wired connection between the access node A and the core network, and the access nodes B and C have no wired connection with the core network element. The access node that supports the wireless access of the UE and transmits data wirelessly is called an IAB node (IAB node).

The access node that provides the wireless backhaul function for the IAB node so that the UE connects to the core network is called an IAB donor (IAB donor). The data of the UE can be transmitted between the access nodes through the wireless backhaul link. For example, the access node B may send the data received from the UE to the access node A through a wireless backhaul link, and then the access node A sends the UE data to the core network element. For the downlink, the core network element can send the UE data packet to the access node A, and then the access node A sends the UE data to the access node B through the wireless backhaul link, and the access node B sends the UE data to the UE through the access link. Access link and backhaul link can use the same or different carrier frequencies. In addition, the data of the UE may need to be transmitted through the multi-hop relay backhaul link between the access node and the core network. In addition, supporting the separate deployment of central unit (CU)/distributed unit (DU) is an important technical feature in NR, and thus it is necessary to support the IAB function in the separate deployment scenario of CU/DU. Topological redundancy has the goal to enable robust operation, e.g., in case of backhaul link blockage, and to balance load across backhaul links. Establishment and management of topological redundancy needs to be considered for the IAB. Currently, only intra-donor topology redundancy is considered, while it is unclear how to support redundancy in other cases, such as what information is exchanged between a master node (MN)

and secondary node (SN). Implementations of the disclosed technology are related to establishment and management of inter-NG-RAN node topological redundancy.

Figure 2:
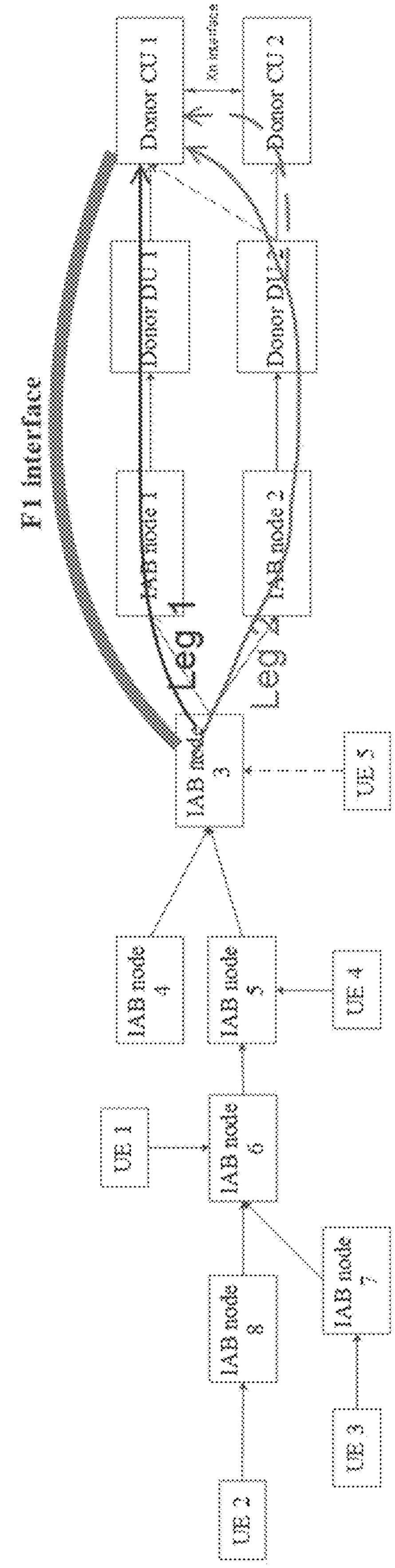
FIG. 2 shows an inter-donor topology redundancy.

FIG. 2 shows an example of an inter-donor topology redundancy. The IAB node 3, referred to as a dual-connecting IAB node or boundary IAB node, starts out with a Master Cell Group (MCG) link to the DU part of the IAB node 1 and adds a Secondary Cell Group (SCG) link to the DU part of the IAB node 2. In this example, the DU part of the IAB node 3 only establishes F1-C (control plane) with donor CU 1. The IAB node 4, the IAB node 5, the IAB node 6, the IAB node 7, and the IAB node 8 are descendant nodes of IAB node 3. UE 1, UE 2, UE 3, and UE 4 are downstream UEs. The first path is established between the IAB node 3 and the donor CU 1, labeled Leg 1 in FIG. 2. An additional path, labeled Leg 2 in FIG. 2, is established between the IAB node 3 and donor CU 1. Donor CU 1 can then migrate traffic for UE 5 and the downstream UEs to Leg 2, balancing the load over both Leg 1 and Leg 2.

A UE can detect a Radio Link Failure (RLF) in an number of situations. For example, a UE can start a radio problem timer after an indication of radio problems from the physical layer. The UE can then declare an RLF if the radio problem expires (if radio problems are recovered before the timer is expired, the UE stops the timer). A UE can also declare an RLF if it detects a random access procedure failure or radio link control (RLC) failure.

A UE can perform several actions after declaring an RLF, such as initiate a Radio Resource Control (RRC) reestablishment procedure. If the RLF occurs at an IAB BH link, the IAB-node can transmit an RLF indication to its child nodes when the reestablishment starts, succeeds, or fails. However, details on these RLF indications are currently unclear, such as what information is included in these indications and how the child nodes use the indications.

Embodiment 1

This embodiment describes a secondary node (SN) Addition procedure in an inter-donor redundancy scenario, where a donor CU 1 sends the backhaul (BH) configuration to IAB-node 3 and descendant nodes before the IAB-node 3 connects to the second parent node. The procedure can be implemented on a system as shown in FIG. 2. For example, IAB-node-3 can be similar to IAB node 3 as shown in FIG. 2.

Step 1: The dual-connecting IAB Mobile Termination (IAB-MT) unit (such as IAB-node-3 in FIG. 2) sends a MeasurementReport message to the first parent node IAB-DU (such as IAB node 1 in FIG. 2). This report is based on a Measurement Configuration that the dual-connecting IAB-MT received from the IAB-donor-CU 1 (such as Donor CU 1 in FIG. 2) previously.

Step 2: The first parent node IAB-DU sends an uplink (UL) Radio Resource Control (RRC) MESSAGE TRANSFER message to the IAB-donor-CU 1 to convey the received MeasurementReport.

Step 3: The donor CU 1 decides to setup a second-path (such as Leg 2 of FIG. 2) for the dual-connecting IAB-node. It sends a first Xn Application Protocol (XnAP) message to donor CU 2 (such as in FIG. 2). The first XnAP message can include any of the following information:

1) Identity of the boundary IAB-node (e.g., the dual-connecting IAB node).
2) Identity of the descendant IAB-node.
3) Identity of the UE. The UE may access the boundary IAB-node or a descendant IAB-node.
4) IAB-node indication of the boundary IAB-node.
5) IAB-node indication of the descendant IAB-node.
6) Identity of an F1-U tunnel, e.g. an M-NG-RAN node UE XnAP ID together with an DRB ID, an index, or a routing ID.
7) Identity of a Transport Network Layer (TNL) association.
8) The F1-C Traffic Type of each TNL association.
9) F1-U tunnel related information including at least one of: DRB quality of services (QoS) information, or information of Flows Mapped to DRB.

In addition, the first XnAP can include any of the following information:

1) An indication to inform donor CU 2 that some packets generated by the descendant nodes of the boundary IAB-node can be forwarded via the second path.
2) A routing ID of each F1-U tunnel for F1-U traffic to be migrated.
3) A routing ID of each TNL association for F1-C traffic to be migrated.
4) An indication. This is used to inform donor CU 2 that the F1-tunnel or TNL association are between donor CU 1 and a DU of the boundary IAB-node.
5) IPv6 flow label or DSCP of each F1-U tunnel.
6) IPv6 flow label or DSCP of each TNL association.
7) IP address of each F1-U tunnel
8) IP address of each TNL association.
9) The following BH radio link control (RLC) channel information at the boundary IAB-node, which is used by donor CU 2 to determine the bearer mapping configuration at the boundary IAB-node:
   a. Prior-Hop BAP Address
   b. Ingress BH RLC channel ID
   c. Next-Hop BAP Address
   d. Egress BH RLC channel ID
   e. QoS parameters Step 4: The IAB-donor-CU 2 sends a UE CONTEXT SETUP REQUEST message to the second parent node IAB-DU (such as IAB node 2 in FIG. 2), to create the UE context for the dual-connecting IAB-MT and to set up one or more bearers. These bearers can be used by the dual-connecting IAB-MT for its own signaling and optionally, data traffic.

At the same time, donor CU2 can configure BH RLC channels and backhaul adaptation protocol (BAP)-layer route entries on the second path between the dual-connecting IAB-node and the second-path IAB-donor-DU. It can also configure the BH configuration to the second-path IAB-donor-DU. Optionally, the donor CU 2 can configure IAB-node 2 such that if the next-hop of the received DL packet refers to the BAP address of IAB-node 3, and IAB-node 2 has not yet been accessed by IAB-node 3, IAB-node 2 buffers the DL packet until IAB-node 3 accesses IAB-node 2.

Step 5: The donor CU 2 responds to donor CU 1 with a second XnAP message. The second XnAP message can include any of the following:

1) Identity of the boundary IAB-node.
2) Identity of the descendant IAB-node.
3) Identity of the UE.
4) Identity of the F1-U tunnel.
5) Identity of the TNL association.
6) The F1-C Traffic Type.
7) A routing ID of each F1-U tunnel for F1-U traffic to be migrated.
8) A routing ID of each TNL association for F1-C traffic to be migrated.

9) A rewritten configuration.
10) A topology ID. The donor CU 2, when it acts as an SN, allocates the same BAP address for all the dual-connected IAB-nodes in its topology. A topology ID is used to differentiate these dual-connected IAB-nodes.
11) An IP address of each F1-U tunnel.
12) An IP address of each TNL association.
13) An IP address of each traffic type.
14) IP addresses allocated at the second donor, which can be used by the boundary node or descendant nodes.
15) An IPv6 flow label or DSCP of each F1-U tunnel
16) An IPv6 flow label or DSCP of each TNL association.
17) A BAP address of the secondary parent node.
18) A BAP addresses used for IAB-node 3. If donor-CU 2 allocates more than one BAP address, it also sends indication(s). The indication can be associated with a BAP address allocated by donor CU 2. The indication is used to inform IAB-node 3 that when the BAP address of the DL packet received from the second parent node matches the BAP address associated with the indication, IAB-node 3 delivers the DL packet to its upper layer.
19) The configuration of the BH RLC channels to be established. Some of the BH RLC channels can be indicated that IAB-node 3 delivers the DL packet received from these BH RLC channels to its upper layer.
20) The routing ID(s) together with an indication. The indication is used to tell IAB-node 3 that the DL packet with the routing ID should be delivered to IAB-node 3's upper layer.
21) BAP layer BH RLC channel mapping information, Uplink Traffic to BH RLC Channel Mapping Configuration, or Uplink Traffic to Routing ID Mapping Configuration.

Step 5b: If donor CU 1 determines the used IP address of the F1-U tunnel to be migrated and TNL association to be migrated, which are anchored at the second-path IAB-donor-DU, it sends the following information to donor CU 2:

1) Identity of the F1-U tunnel.
2) Identity of the TNL association.
3) An IP address of each F1-U tunnel.
4) An IP address of each TNL association.
5) An IP address of each traffic type.
6) An IPv6 flow label or DSCP of each F1-U tunnel.
7) An IPv6 flow label or DSCP of each TNL association.

If IPsec is enabled, the IP address refers to outer IP address.

After receiving the message from donor-CU 1, donor-CU 2 can configure the BH configuration for the second-path IAB-donor-DU in this step.

Step 6: The IAB-donor-CU 1 sends a DL RRC MESSAGE TRANSFER message to the IAB-node 1, which includes a generated RRCReconfiguration message. The RRCReconfiguration message can contain one or more TNL addresses for the dual-connecting IAB-DU, which are anchored at the second-path IAB-donor-DU. If IPsec tunnel mode is used to protect the F1 and non-F1 traffic, the allocated TNL address is the outer IP address.

The RRCReconfiguration message can include the rewritten configuration.

The RRCReconfiguration message can contain BAP addresses used for IAB-node 3. If donor-CU 2 allocates more than one BAP address, the message also include indication(s). The indication can be associated with a BAP address allocated by donor CU 2. The indication is used to inform IAB-node 3 that when the BAP address of the DL packet received from the second parent node matches the BAP address associated with the indication, IAB-node 3 delivers the DL packet to its upper layer.

The RRCReconfiguration message can contain the configuration of the BH RLC channels to be established. Some of the BH RLC channels can be indicated such that IAB-node 3 delivers the DL packet received from these BH RLC channels to its upper layer.

The RRCReconfiguration message can contain one or more routing IDs together with an indication. The indication is used to tell IAB-node 3 that the DL packet with the routing ID should be delivered to IAB-node 3's upper layer.

Optionally, the RRCReconfiguration message can include an SN RRC configuration message.

Optionally, the RRCReconfiguration message can include the F1-C transfer path, e.g. the MCG link, the SCG link or both.

Optionally, the RRCReconfiguration message can include whether the secondary node or the PSCell or the SCell supports IAB function or not.

Step 7: Donor CU 1 can send a set of BH configurations to IAB-node 3 together with an indication or a topology identity via an F1AP message. The indication informs IAB-node 3 that the set of BH configurations are used for UL/DL packet forwarding along the second path. Alternatively, donor CU 1 can also update the set of BH configurations for IAB-node 3. Donor CU 1 can send an indication to IAB-node 3 in order to tell IAB-node 3 that the received set of BH configurations are used after the second link is established between IAB-node 3 and secondary parent node.

The set BH configurations can include one or more of the following:

1) A rewritten configuration.
2) A bearer mapping and route configuration.
3) Routing ID(s) together with an indication. The indication is used to tell IAB-node 3 that the DL packet with the routing ID should be delivered to IAB-node 3's upper layer.
4) The IP address of the F1-U tunnel to be migrated to the second path.
5) The IP address of the TNL association to be migrated to the second path.

If IPsec is enabled, the IP address refers to outer IP address.

Donor-CU 1 can send an F1AP message to a descendant node, including the IP addresses of the F1-U tunnels to be migrated to the second path or the IP addresses of the TNL associations to be migrated to the second path. If IPsec is enabled, the IP addresses refers to outer IP addresses.

Donor-CU 1 can send an F1AP message to a descendant node, including an IPv6 flow label and/or a DSCP for each TNL association to be migrated to the second path or an IPv6 flow label and/or a DSCP for each GTP tunnel to be migrated to the second path.

Donor-CU 1 can modify the routing ID of the F1-U tunnel to be migrated to the second path. Donor-CU 1 can modify the routing ID of TNL association to be migrated to the second path.

In this case, a UL packet sent to the second parent node can arrive at IAB-node 3 before the second link is successfully established. Upon receiving the packet, IAB-node 3 first checks whether the routing ID of the packet needs to be rewritten. If yes, it rewrites the routing ID in the BAP header and buffers the packet until the second link is successful established.

Step 8: After receiving the BH configuration, IAB-node 3 can update the downlink (DL) user plane (UP) TNL Information related to the DL F1-U GPRS Tunneling Protocol (GTP) tunnels to be migrated and transmit to donor 1 CU-Control Plane (CU-CP) the updated DL UP TNL Information.

After receiving the F1AP message, a descendant node can update the DL UP TNL Information related to the DL F1-U GTP tunnels to be migrated and send to donor 1 CU-CP the updated DL UP TNL Information.

Step 9: The IAB-node 1 forwards the received RRCReconfiguration message to the IAB-MT 3.

Step 10: The IAB-MT 3 responds to the IAB-DU 1 with an RRCReconfigurationComplete message, including an SN RRC response message, if needed.

Step 11: The IAB-DU 1 sends an UL RRC MESSAGE TRANSFER message to the IAB-donor-CU 1 to convey the received RRCReconfigurationComplete message.

Step 12: The donor CU 1 informs the donor CU 2 that the IAB-MT 3 has completed the reconfiguration procedure successfully via an XnAP message, including the SN RRC response message if received from the IAB-MT 3.

Step 13: A Random Access procedure is performed at the IAB-DU 2.

Step 14: Donor CU 2 sends an indication to donor-CU 1 that CU2 has successfully accessed IAB-node 3 MT. Alternatively, IAB-node 3 can send the success indication regarding the establishment of the second link to donor CU 1.

Step 15: Donor CU 2 sends a rewritten configuration to IAB-node 3 via signaling radio bearer 3 (SRB3) if SRB3 has already been established between IAB-node 3 and donor-CU 2.

Step 16: Donor 1 CU-CP can request the donor 1 CU-UP to update the DL UP TNL information related to the DL F1-U GTP tunnels to be migrated. In addition, the IPv6 flow label or DSCP of each F1-U tunnel to be migrated can be sent to donor 1 CU-UP. Donor CU 1 CU-UP can inform the CU-CP about the updated UL UP TNL information related to the UL F1-U GTP tunnels to be migrated. Then donor-CU 1 can send the updated UL UP TNL Information related to the UL F1-U GTP tunnels to be migrated to IAB-node 3 and any descendant nodes.

Step 17: The unused BH RLC channels at the first IAB-donor-DU and at the IAB-nodes along the first path are released.

Embodiment 2

This embodiment describes an SN Addition procedure in an inter-donor redundancy scenario (such as in FIG. 1), where donor CU 1 sends a BH configuration to IAB-node 3 and its descendant nodes after the IAB-node 3 connects to the second parent node.

Step 1: The dual-connecting IAB-MT sends a MeasurementReport message to the first parent node IAB-DU. This report is based on a Measurement Configuration the dual-connecting IAB-MT previously received from the IAB-donor-CU 1.

Step 2: The first parent node IAB-DU sends a UL RRC MESSAGE TRANSFER message to the IAB-donor-CU 1 to convey the received MeasurementReport.

Step 3: The donor CU 1 decides to setup a second path for the dual-connecting IAB-node. It sends a first XnAP message to donor CU 2. The information in the first XnAP message described in Embodiment 1 is also suitable for the XnAP message 1 in this embodiment.

Step 4: The IAB-donor-CU 2 sends the UE CONTEXT SETUP REQUEST message to the second parent node IAB-DU, to create the UE context for the dual-connecting IAB-MT and to set up one or more bearers. These bearers can be used by the dual-connecting IAB-MT for its own signaling, and, optionally, data traffic.

Step 5: The second parent node IAB-DU responds to the IAB-donor-CU with a UE CONTEXT SETUP RESPONSE message.

Step 6: The donor CU 2 responds to donor CU 1 with a second XnAP message. The information in the second XnAP message described in Embodiment 1 is also suitable for the XnAP message 2 in this embodiment.

Step 6b: If donor CU 1 determines the used IP address of the F1-U tunnel to be migrated and TNL association to be migrated, it sends the following information to donor CU 2:

1) Identity of the F1-U tunnel.
2) Identity of the TNL association.
3) An IP address of each F1-U tunnel.
4) An IP address of each TNL association.
5) An IP address of each traffic type.
6) An IPv6 flow label or DSCP of each F1-U tunnel.
7) An IPv6 flow label or DSCP of each TNL association.

If IPsec is enabled, the IP address refers to outer IP address.

Step 7: The IAB-donor-CU 1 sends a DL RRC MESSAGE TRANSFER message to the IAB-node 1, which includes a generated RRCReconfiguration message. The RRCReconfiguration message can contain one or more TNL address(es) for the dual-connecting IAB-DU, which are anchored at the second-path IAB-donor-DU. If IPsec tunnel mode is used to protect the F1 and non-F1 traffic, the allocated TNL address is the outer IP address.

The RRCReconfiguration message can contain BAP addresses used for IAB-node 3. If donor-CU 2 allocates more than one BAP address, the message also include indication(s). The indication can be associated with a BAP address allocated by donor CU 2. The indication is used to inform IAB-node 3 that when the BAP address of the DL packet received from the second parent node matches the BAP address associated with the indication, IAB-node 3 delivers the DL packet to its upper layer.

The RRCReconfiguration message can contain the configuration of the BH RLC channels to be established. Some of the BH RLC channels can be indicated such that IAB-node 3 delivers the DL packet received from these BH RLC channels to its upper layer.

The RRCReconfiguration message can contain one or more routing IDs together with an indication. The indication is used to tell IAB-node 3 that the DL packet with the routing ID should be delivered to IAB-node 3's upper layer.

Optionally, the RRCReconfiguration message includes the SN RRC configuration message.

Optionally, the RRCReconfiguration message can include the F1-C transfer path, e.g. the MCG link, the SCG link or both.

Optionally, the RRCReconfiguration message can include whether the secondary node or the PSCell or the SCell supports IAB function or not.

Step 8: The IAB-node 1 forwards the received RRCReconfiguration message to the IAB-MT 3.

Step 9: The IAB-MT 3 responds to the IAB-DU 1 with an RRCReconfigurationComplete message, including an SN RRC response message, if needed.

Step 10: The IAB-DU 1 sends an UL RRC MESSAGE TRANSFER message to the IAB-donor-CU 1 to convey the received RRCReconfigurationComplete message.

Step 11: The donor CU 1 informs the donor CU 2 that the IAB-MT 3 has completed the reconfiguration procedure successfully via an XnAP message, including the SN RRC response message, if received from the IAB-MT 3.

Step 12: A Random Access procedure is performed at the IAB-DU 2.

Step 13: The IAB-donor-CU 2 configures BH RLC channels and BAP-layer route entries on the second path between the dual-connecting IAB-node and second-path IAB-donor-DU. These configurations can be performed at an earlier stage, e.g. immediately after step 4.

The IAB-donor-CU 2 can configure the BH configuration to second-path IAB-donor-DU. This configuration can be performed at an earlier stage, e.g. immediately after step 4 or step 6b.

Step 14: Donor CU 2 sends donor CU 1 an XnAP message, including at least one of:

1) BH RLC channel configuration generated by IAB-DU 2.
2) BAP Address of the secondary parent node.
3) BAP address of IAB-node 3, which is allocated by donor-CU 2.
4) Uplink Traffic to BH RLC Channel Mapping Configuration and Uplink Traffic to Routing ID Mapping Configuration.

The information in the second XnAP message described in Embodiment 1 is also suitable for the XnAP message in this step.

Step 15: Donor CU 1 responses donor-CU 2 with an XnAP message.

Step 16: Donor CU 2 sends rewritten configuration to IAB-node 3 via SRB3, if SRB3 has already established between IAB-node 3 and donor-CU 2.

Step 17: Donor CU 1 sends BH configuration to IAB node 3, which at least includes one of: bearer mapping, route configuration, BH RLC channel to be established, Uplink Traffic to BH RLC Channel Mapping Configuration, or Uplink Traffic to Routing ID Mapping Configuration. The BH configuration sent to IAB-node 3 described in Embodiment 1 is also suitable for this embodiment.

Donor-CU 1 can send an F1AP message to a descendant node. The specific information in the message can be the same as that in the F1AP message sent to the descendant node described in Embodiment 1.

Step 18: After receiving the BH configuration, IAB-node 3 can update the DL UP TNL Information related to the DL F1-U GTP tunnels to be migrated and transmit to donor 1 CU-CP the updated DL UP TNL Information.

After receiving the F1AP message, a descendant node can update the DL UP TNL Information related to the DL F1-U GTP tunnels to be migrated, and transmit to donor 1 CU-CP the updated DL UP TNL Information.

Step 19: Donor 1 CU-CP requests the donor 1 CU-UP to update the DL UP TNL Information related to the DL F1-U GTP tunnels to be migrated. In addition, the IPv6 flow label or DSCP of each F1-U tunnel to be migrated can be sent to donor 1 CU-UP. Donor CU 1 CU-UP can inform the CU-CP about the updated UL UP TNL Information related to the UL F1-U GTP tunnels to be migrated. Then, the donor-CU 1 can send to IAB-node 3 and any descendant nodes the updated UL UP TNL Information related to the UL F1-U GTP tunnels to be migrated.

Embodiment 3

As mentioned in connection with Embodiment 1, the boundary IAB-node can receive a rewritten configuration. In this embodiment, one design of the rewritten configuration is given. The rewritten configuration at least includes the mapping between a first routing ID allocated by donor CU 1 and a second routing ID allocated by donor CU 2.

In this embodiment, after receiving a UL packet, IAB-node 3 first judges whether the routing ID of the packet should be rewritten by checking the rewritten configuration. If the routing ID is not included in the rewritten configuration, IAB-node 3 delivers the packet to the corresponding egress BH RLC channel. Otherwise, IAB-node 3 rewrites the routing ID according to the rewritten configuration, and then delivers it to the egress BH RLC channel based on the rewritten routing ID or ingress BH RLC channel.

For DL packets, IAB-node 3 first checks whether the BAP header of the DL packet should be rewritten according to the rewritten configuration. If needed, IAB-node 3 can rewrite the BAP header of the DL packet and deliver the packet to the corresponding egress BH RLC channel based on the rewritten routing ID or ingress BH RLC channel.

For UL packets, when the BAP entity has a BAP data packet to transmit at the boundary IAB-node, the transmitting part of the BAP entity can 1) check the rewritten configuration to determine whether to rewrite the BAP header of the received BAP data packet. If needed, the BAP entity can rewrite the BAP header of the received BAP data packet according to the rewritten configuration; 2) determine the egress BH RLC channel towards the second parent node; and 3) submit the BAP Data Protocol Data Unit (PDU) to the selected egress BH RLC channel.

For DL packets, when the BAP entity has a BAP data packet to transmit at the boundary IAB-node, and the BAP data packet is received from the second parent node, the transmitting part of the BAP entity can: 1) check with the rewritten configuration to determine whether to rewrite the BAP header of the received BAP data packet. If needed, the BAP entity can rewrite the BAP header of the received BAP data packet according to the rewritten configuration; 2) perform routing to determine the egress link; 3) determine the egress BH RLC channel; 4) submit the BAP Data PDU to the selected egress BH RLC channel of the selected egress link.

Embodiment 4

As mentioned in connection with Embodiment 1, the boundary IAB-node can receive a rewritten configuration. In this embodiment, one design of the rewritten configuration is described. To be specific, the rewritten configuration at least includes a mapping between IP header information and the routing ID to be rewritten. The boundary IAB-node can rewrite the BAP header according to the rewritten configuration. Note that the IP address mentioned in this embodiment refers to outer IP address if IPsec is enabled.

For UL Packet Transfer:

Option 1

Before donor CU 1 sends a XnAP message to donor-CU 2, such as described in step 3 in Embodiment 1, donor CU 1 configures an IPv6 flow label and/or a DSCP for each TNL association for F1-C traffic for an IAB-node. Moreover, it configures an IPv6 flow label and/or a DSCP for each GTP tunnel for F1-U traffic for an IAB-node. Donor-CU 1 can configure the same IPv6 flow label and/or a DSCP for several TNL associations for F1-C traffic. Donor-CU 1 can also configure the same IPv6 flow label and/or a DSCP for several GTP tunnels for F1-U traffic. In this case, donor CU 1 can modify the IPv6 flow label and/or a DSCP for a TNL association for F1-C traffic. Donor-CU 1 can also modify the IPv6 flow label and/or a DSCP for a GTP tunnel for F1-U traffic. These modification procedures can happen before or after the boundary node succeeds in connecting to the second donor-CU.

The rewritten configuration can include the source IP address, destination IP address, IPv6 flow label and/or a DSCP, the source IP address to be re-written, the destination IP address to be rewritten and the routing ID to be rewritten. When the BAP entity has a BAP data packet to transmit at the boundary IAB-node, the transmitting part of the BAP entity can: 1) read the IP header; 2) check the rewritten configuration to figure out whether the IP header information (IP address, flow label, DSCP) is included in the rewritten configuration. If needed, the BAP entity can rewrite the routing ID, the source IP address, and/or destination IP address of the received BAP data packet according to the rewritten configuration; 3) determine the egress BH RLC channel towards the second parent node according to the IP header information or rewritten IP header information or the ingress BH RLC channel; 4) submit the BAP Data PDU to the selected egress BH RLC channel.

Option 2

In this example, Donor CU 1 sends a rewritten configuration to the descendant node. This can happen before or after the boundary node succeeds in connecting to the second donor-CU. The rewritten configuration can be configured by donor CU 1 or donor CU 2. The rewritten configuration can include:

1) An IPv6 flow label and/or a DSCP for each TNL association to be migrated.
2) An IPv6 flow label and/or a DSCP for each GTP tunnel to be migrated.
3) IP address for each TNL association to be migrated.
4) IP address for each GTP tunnel to be migrated.

The rewritten configuration can include the source IP address, destination IP address, IPv6 flow label and/or a DSCP, and the routing ID to be rewritten.

When the BAP entity has a BAP data packet to transmit at the boundary IAB-node, the transmitting part of the BAP entity can: 1) read the IP header; 2) check the rewritten configuration to figure out whether the IP header information is included in the rewritten configuration. If needed, the BAP entity can rewrite the routing ID of the received BAP data packet according to the BAP rewritten configuration; 3) determine the egress BH RLC channel towards the second parent node according to the IP header information or the ingress BH RLC channel; submit the BAP Data PDU to the selected egress BH RLC channel.

For DL Packet Transfer:

In this example, the boundary node receives a rewritten configuration before receiving a DL packet from the second parent node. The rewritten configuration can be configured by donor CU 1 or donor CU 2 and can be received from donor CU 1 or donor CU 2. The rewritten configuration can include at least one of:

1) A specific IP address
2) A specific flow label;
3) A specific DSCP

After receiving a DL packet from the second parent node, the boundary node first checks the rewritten configuration. If the IP header information of the DL packet matches the rewritten configuration, the boundary node delivers the DL packet to its upper layer. If the IP header information of the DL packet matches: the specific IP address, the specific flow label, the specific DSCP, the specific IP address and the specific flow label, or the specific IP address and the specific DSCP; then the boundary IAB-node delivers the DL packet to its upper layer.

Figure 3:
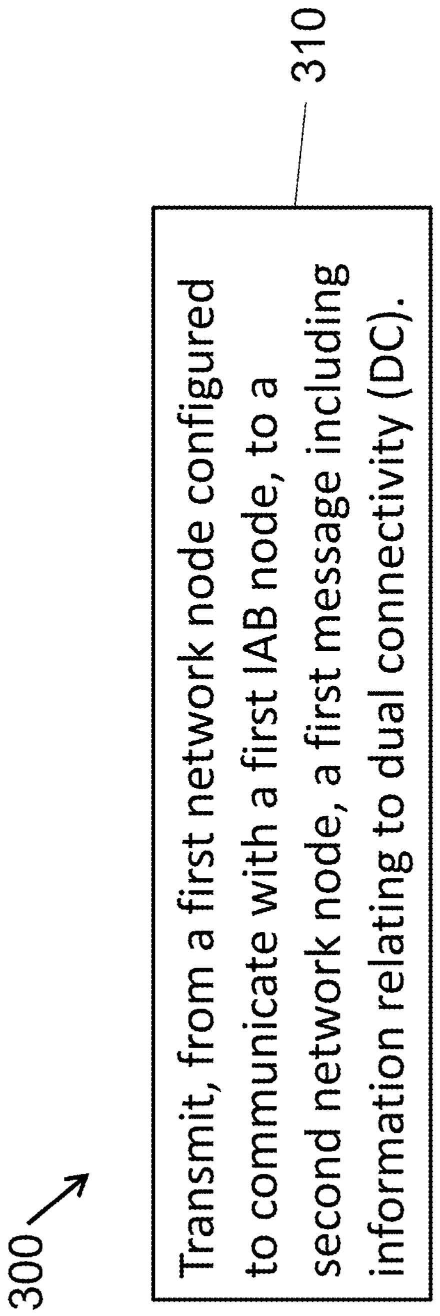
FIG. 3 shows an example method.

FIG. 3 shows an example method 300. At 310, a first message including information relating to dual connectivity is transmitted from a first network node configured to communicate with a first IAB node to a second network node. In some embodiments, the first network node is a first IAB-donor and the second network node is a second IAB-donor. The first and second IAB donor can each comprise an IAB-donor CU and one or more IAB-donor-DUs. In some embodiments, the IAB-donor CU can be separated into gNB-CU-CP and gNB-CU-UP, so the IAB-donor can comprise an IAB-donor-CU-CP, one or more IAB-donor-CU-UPs, and one or more IAN-donor-DUs.

Embodiment 5

Embodiments 5 and 6 use the following terminology:

Type-2 indication: An indication that an RLF is detected or an RLF is ongoing.

Type-3 indication: An indication that an RLF has been successfully recovered.

Type-4 indication: In indication that an RLF has failed to recover.

An RLF may include an RLF or BH RLF.

An indication can include one or more routing IDs. A routing ID included in an indication can be considered impacted by an RLF depending on the type of indication. For example, a routing ID included in a type-2 indication can be considered (designated) as impacted.

Routing IDs that are impacted by an RLF, could mean at least one of the following:

Routing IDs are unavailable or are potentially unavailable.

There are no available routing entries or paths or next hops for the impacted routing IDs.

Routing IDs not impacted by an RLF, could mean at least one of the following:

Routing IDs are available or are potentially available.

There are available routing entries or paths or next hops for these routing IDs.

Figure 4A:
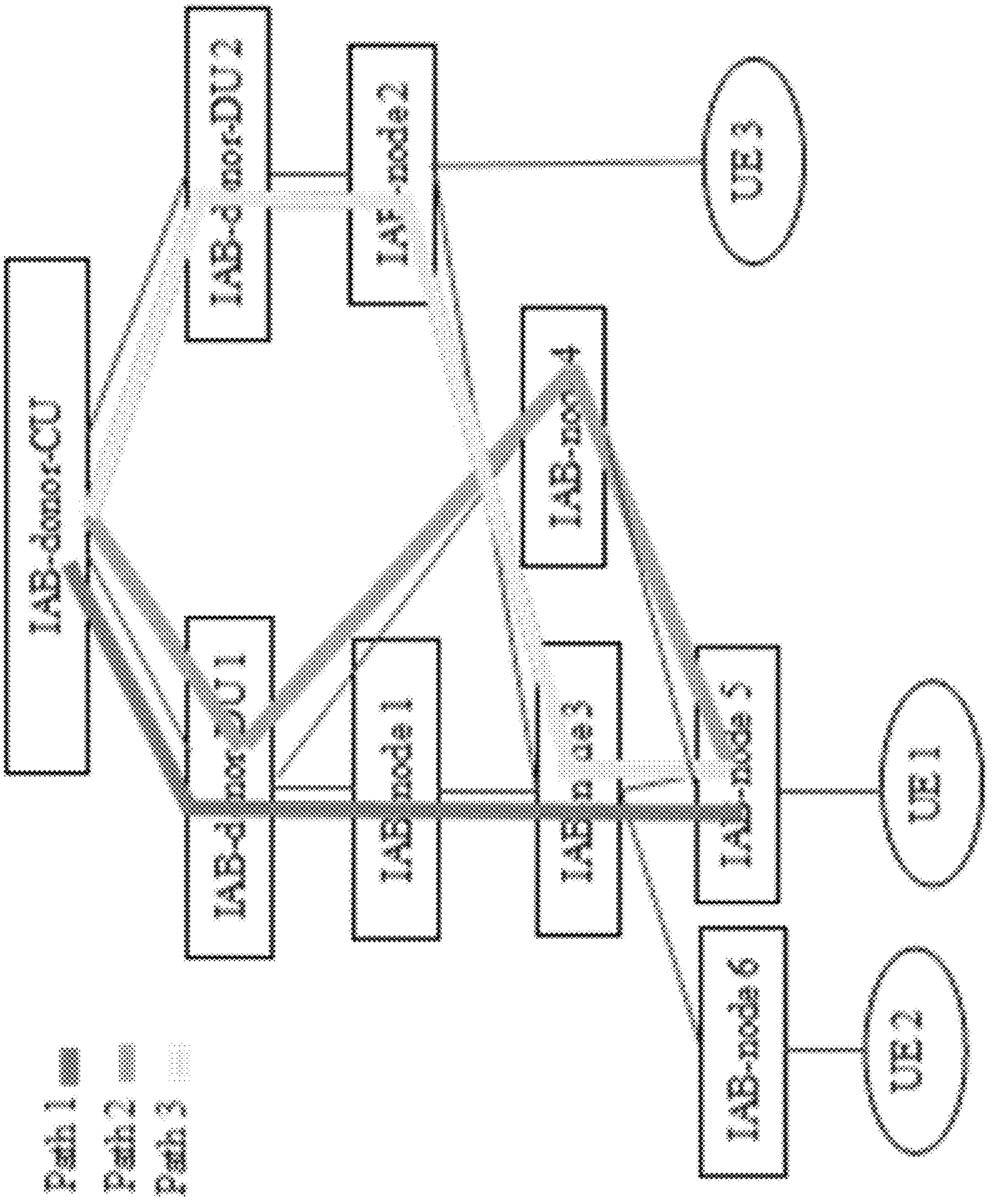
FIG. 4A shows an example Radio Link Failure (RLF) scenario.

FIG. 4A shows an example Radio Link Failure (RLF) scenario. When IAB-node 1 detects a RLF, it sends a type-2 indication to IAB-node 3, IAB-node 1 includes the impacted routing IDs considered in the type-2 indication. Upon receiving a type-2 indication, IAB-node 3 can determine the impacted routing IDs. If IAB-node 3 finds that some of the included routing IDs can be re-routed once it receives a type-4 indication from IAB-node 1 in the future, IAB-node 3 can remove these routing IDs and consider the remaining routing IDs as impacted by the RLF. The IAB-node 3 can then send a type-2 indication to IAB-node 5, and the included routing IDs in this type-2 indication are considered by IAB-node 3 as unavailable paths once a type-4 indication is received.

When sending a type-2 indication to its child IAB-nodes, an IAB-node includes the routing IDs which are considered as impacted by RLF.

When sending a type-3 indication to its child IAB-nodes, an IAB-node includes the routing IDs which are considered as not impacted by RLF.

A non-DC-connected IAB-node can perform at least one of the following actions:

1) If it detects an RLF, it considers all routing IDs to be uplinked as impacted by RLF and sends a type-2 indication to its child IAB-nodes.
2) If it receives a type-2 indication, it considers the included routing IDs as impacted by RLF.
3) If it receives a type-2 indication, it sends a type-2 RLF indication to its child IAB-nodes.
4) If it receives a type-3 indication, it considers the included routing IDs as not impacted by RLF.

a. In another embodiment: If it receives a type-3 indication, it considers the routing IDs included in previous type-2 indication as not impacted by RLF.

5) If it receives a type-3 indication, it sends a type-3 indication to its child IAB-nodes.

A DC-connected IAB-node can perform at least one of the following actions:

1) If it receives a type-2 indication from a first link, it considers the included routing IDs as impacted by RLF, excluding those routing IDs which can be re-routed once it receives a type-4 indication from that link in future. The IAB node then sends a type-2 indication to its child IAB-nodes even though it's connected to a second link that is not experiencing an RLF.

2) In another embodiment: If it receives a type-2 indication from a first link, it considers the included routing IDs as impacted by RLF excluding those routing IDs which can be re-routed, and it sends a type-2 indication to its child IAB-nodes even though it's connected to a second link that is not experiencing an RLF.

3) If it receives a type-3 indication from one link, it considers the included routing IDs as not impacted by RLF anymore.

a. In another embodiment: If it receives a type-3 indication from one link, it considers the routing IDs included in previous type-2 indication from that link as not impacted by RLF anymore.

4) If it receives a type-3 indication from one link, it sends a type-3 indication to its child IAB-nodes.

In one embodiment, when an IAB-node sends a type-2 indication to a child IAB-node, the type-2 indication includes one or more routing ID(s). These routing ID(s) are impacted by RLF. Meanwhile, at the IAB-node, the previous hop of these routing ID(s) is the child IAB-node.

In one embodiment, when an IAB-node sends a type-2 indication to a child IAB-node, the type 2 indication can include no routing IDs.

In one embodiment, when an IAB-node sends a type-3 indication to a child IAB-node, the type-3 indication includes one or more routing ID(s). These routing ID(s) are not impacted by RLF anymore. At the IAB-node, the previous hop of these routing ID(s) is the child IAB-node.

In one embodiment, when an IAB-node sends a type-3 indication to a child IAB-node, there are no routing IDs included in the type-3 indication.

Figure 5:
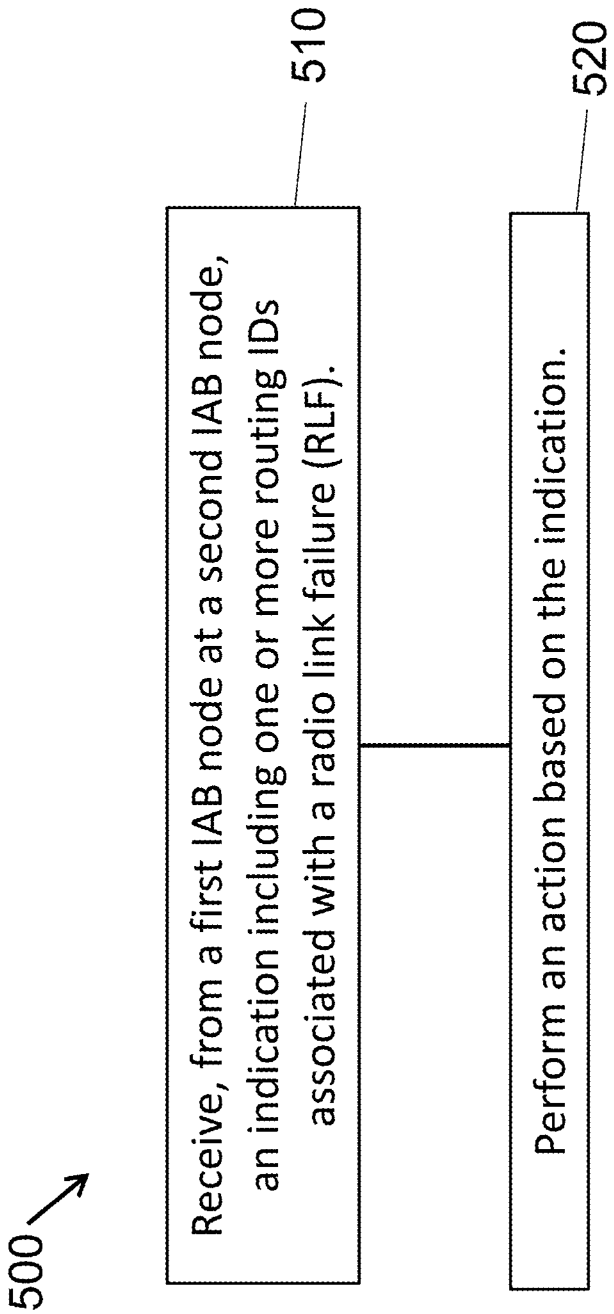
FIG. 5 shows an example method.

FIG. 5 shows an example method 500. At 510, an indication including one or more routing IDs associated with an RLF is received from a first IAB node at a second IAB node. At 520, an action is performed based on the indication. The indication can indicate that the one or more routing IDs are unavailable, such as for a type 2 indication described above. The indication can indicate that the one or more routing IDs are available, such as for a type 3 indication as described above. The action can comprise designating, at the second IAB node, the one or more routing IDs as unavailable. The action can comprise designating, at the second IAB node, the one or more routing IDs as available. The action can also comprise transmitting a second indication to a third IAB node. The second indication can indicate the one or more routing IDs as available, unavailable, potentially available/unavailable, or that routing entries, paths, or next hops are available or unavailable. Note that the action can include both designating and transmitting. In some embodiments, a subset of the one or more routing IDs can be designated or transmitted. In some embodiments, a previous hop of one or more of the routing IDs can be the third IAB node.

Embodiment 6

In this embodiment, when an IAB-node performs local rerouting, it can change a routing ID in a backhaul adaption protocol (BAP) protocol data unit (PDU) from an old routing ID to a new routing ID according to a mapping rule. This embodiment can apply in scenarios similar to those described in Embodiment 5 and FIG. 4A.

An IAB-node can perform inter-donor-DU local rerouting in at least one of the following cases:

1) For an IAB-node, when performing inter-CU RLF recovery, inter-CU migration, inter-donor-DU migration, and/or inter-donor-DU RLF recovery.

2) For an IAB-node, upon receiving information from its parent IAB node which indicates a successful or ongoing migration of an upstream IAB node, wherein the migration may be an inter-CU RLF recovery, an inter-CU migration, an inter-donor-DU migration, or an inter-donor-DU RLF recovery.

3) For an IAB-node or a DC-connected IAB-node, upon detecting an RLF in one link; upon receiving type-2 RLF indication (i.e., BH RLF is ongoing) in one link; upon receiving type-4 RLF indication (i.e. BH RLF recovery fails) in one link; or upon determining the routing ID in a received BAP PDU is unavailable.

A donor-CU (e.g., IAB-donor-CU in FIG. 4A) configures the IAB-node (e.g., IAB-node-1 in FIG. 4A) with a mapping rule between the first routing ID correlated to a first IAB-donor-DU (e.g., IAB-donor-DU 1 in FIG. 4A) and a second routing ID correlated to a second IAB-donor-DU (e.g., IAB-donor-DU 1 in FIG. 4A).

Figure 4B:
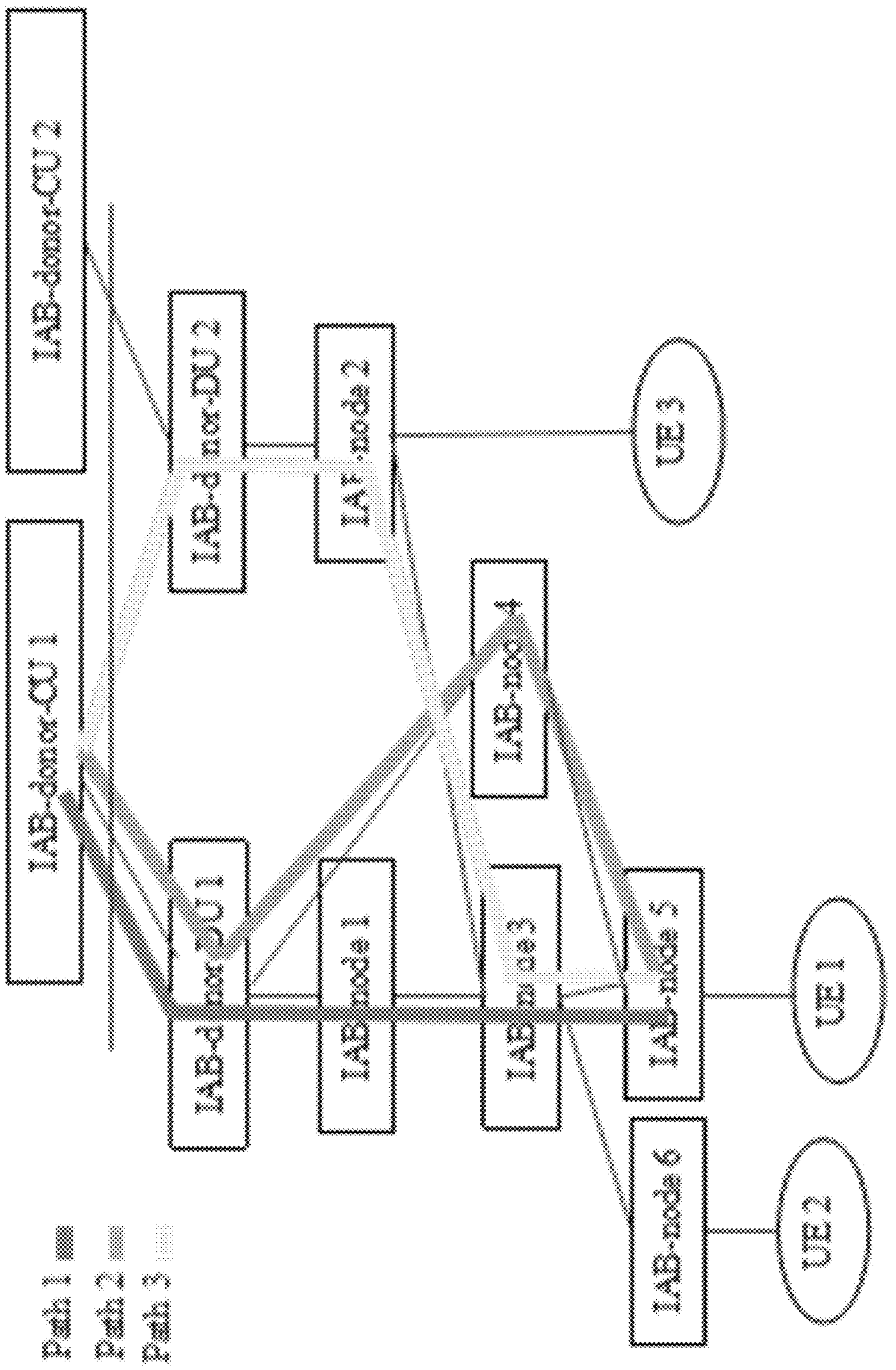
FIG. 4B shows an example RLF scenario with two donor CUs.

FIG. 4B shows an example RLF scenario with multiple donor CUs. An IAB-node, such as IAB-node-3, can be DC-connected to two different IAB-donor-CUs or migrate from one IAB-donor-CU to another IAB-donor-CU. In these situations, the first donor-CU can inform the second donor-CU of the IAB-node's routing entries correlated to the first IAB-donor-DU. Likewise, the second donor-CU can inform the first donor-CU of the IAB-node's routing entries correlated to the second IAB-donor-DU.

Figure 6:
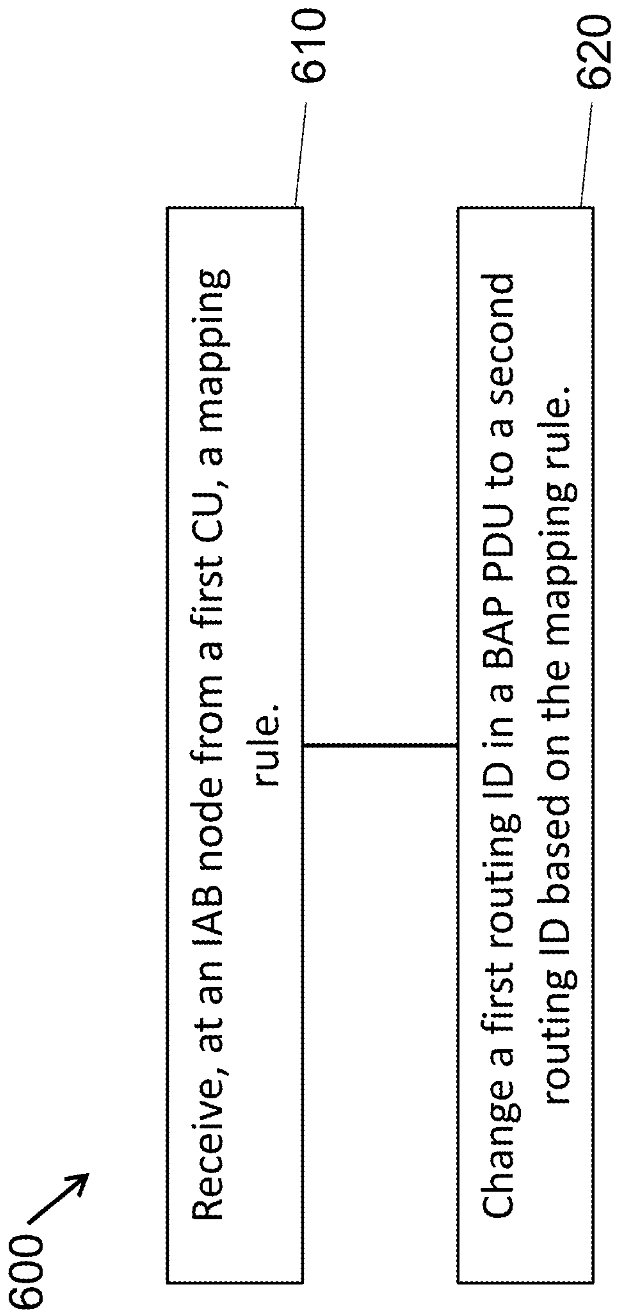
FIG. 6 shows an example method.

FIG. 6 shows an example method 600. At 610, a mapping rule is received at an IAB node from a first CU. At 620, a first routing ID in a BAP PDU is changed to a second routing ID based on the mapping rule. In some embodiments, the IAB node is dual-connecting. Changing the routing ID can be associated with at least one of: an inter-CU RLF recovery, an inter-CU migration, an inter-donor-DU migration, or an inter-donor-DU RLF recovery. In one example, the first routing ID is associated with a first DU of the first CU, and the second routing ID is associated with a second DU of the first CU. In another example, the first routing ID is associated with a first DU of the first CU, and the second routing ID is associated with a second DU of a second CU. The changing the routing ID can be in response to an event, such as receiving an indication relating to a migration of an upstream IAB node, such as an inter-CU RLF recovery, an inter-CU migration, an inter-donor-DU migration, or an inter-donor-DU RLF recovery.

Figure 7:
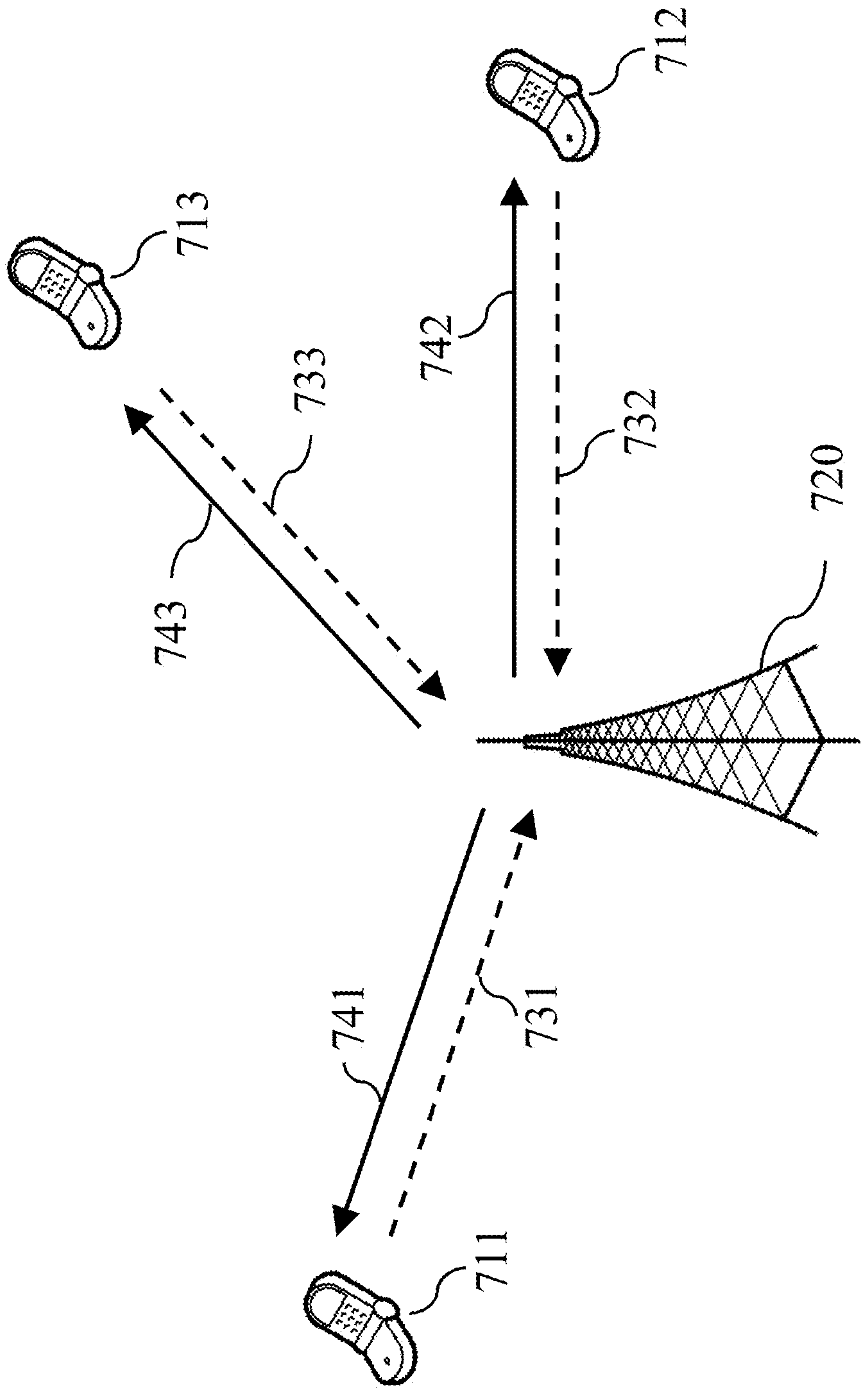
FIG. 7 shows an example of wireless communication including a base station (BS) and user equipment (UE) based on some implementations of the disclosed technology.

The implementations as discussed above will apply to a wireless communication. FIG. 7 shows an example of a wireless communication system (e.g., a 5G or NR cellular network) that includes a BS 720 and one or more user equipment (UE) 711, 712 and 713. In some embodiments, the UEs access the BS (e.g., the network) using implementations of the disclosed technology 731, 732, 733), which then enables subsequent communication (741, 742, 743) from the BS to the UEs. The UE may be, for example, a smartphone, a tablet, a mobile computer, a machine to machine (M2M) device, an Internet of Things (IoT) device, and so on.

Figure 8:
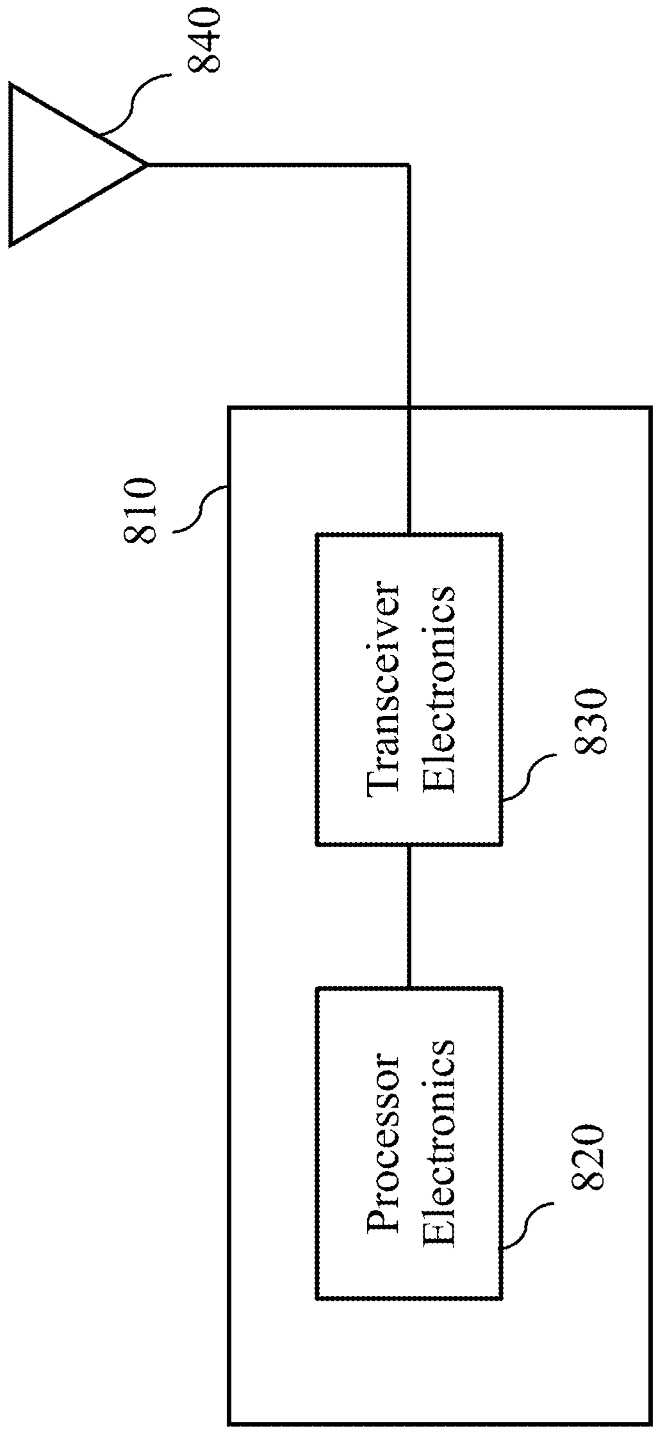
FIG. 8 shows an example of a block diagram of a portion of an apparatus based on some implementations of the disclosed technology.

FIG. 8 shows an example of a block diagram representation of a portion of an apparatus. An apparatus 810 such as a base station or a user device which may be any wireless device (or UE) can include processor electronics 820 such as a microprocessor that implements one or more of the techniques presented in this document. The apparatus 810 can include transceiver electronics 830 to send and/or receive wireless signals over one or more communication interfaces such as antenna 840. The apparatus 810 can include other communication interfaces for transmitting and receiving data. The apparatus 810 can include one or more memories (not explicitly shown) configured to store information such as data and/or instructions. In some implementations, the processor electronics 820 can include at least a portion of transceiver electronics 830. In some embodiments, at least some of the disclosed techniques, modules or functions are implemented using the apparatus 810.

Some embodiments may preferably incorporate the following solutions as described herein.

For example, the solutions listed below may be used by a network device for inter-donor redundancy scenarios as described herein (e.g., as described in FIGS. 2 and 3 and Embodiments 1-4.)

1. A method of wireless communication (e.g., method 300 in FIG. 3) comprising: transmitting, from a first network node configured to communicate with a first integrated access and backhaul (IAB) node, to a second network node, a first message including information relating to dual connectivity (DC) (310).
2. The method of solution 1, wherein the first network node is a first IAB-donor and the second network node is a second IAB-donor.
3. The method of solution 2, wherein the first IAB-donor comprises a first IAB-donor-CU-CP, a first plurality of IAB-donor-CU-UPs, and a first plurality of IAB-donor-DUs, and the second IAB-donor comprises a second IAB-donor-CU-CP, a second plurality of IAB-donor-CU-UPs, and a second plurality of IAB-donor-DUs.
4. The method of solution 1, further comprising: receiving, at the first network node, a second message that includes configuration information.
5. The method of solution 1, wherein the first message includes an identification of an F1-U tunnel.
6. The method of solution 1, wherein the first message includes an identification of a transport network layer (TNL) association, or a traffic type of the TNL association.
7. The method of solution 5, wherein the first message further includes at least one of: a routing ID associated with the F1-U tunnel, an indication the F1-U tunnel is between a CU-user plane (CU-UP) and a distributed unit (DU) of a dual-connecting IAB-node, an IPv6 flow label associated with the F1-U tunnel, a Differentiated Service Code Point (DSCP) associated with the F1-U tunnel, or an IP address associated with the F1-U tunnel.
8. The method of solution 6, wherein the first message further includes at least one of: a routing ID associated with the TNL association, an indication, that the TNL association is between a CU-CP and a DU of a dual-connecting IAB-node, an IPv6 flow label associated with the TNL association, a Differentiated Service Code Point (DSCP) associated with the TNL association, or an IP address associated with the TNL association.
9. The method of solution 1, wherein the first message further includes at least one of: quality of service (QoS) information of a data radio bearer (DRB), or information relating to flows mapped to the DRB.
10. The method of solution 4, wherein the second message includes an identification of an F1-U tunnel.
11. The method of solution 4, wherein the second message includes an identification of a TNL association, or a traffic type of the TNL association.
12. The method of solution 10, wherein the second message further includes at least one of: a routing ID associated with the F1-U tunnel, an IPv6 flow label associated with the F1-U tunnel, a DSCP associated with the F1-U tunnel, or an IP address associated with the F1-U tunnel.
13. The method of solution 11, wherein the second message further includes at least one of: a routing ID associated with the TNL association, an IPv6 flow label associated with the TNL association, a Differentiated Service Code Point (DSCP) associated with the TNL association, or an IP address associated with the TNL association.
14. The method of solution 4, wherein the second message includes a backhaul adaptation protocol (BAP) address and an indication.
15. The method of solution 4, wherein the second message includes a configuration of a BH RLC channel to be established and an indication.
16. The method of solution 4, wherein the second message includes a routing ID and an indication.
17. The method of solution 4, wherein the second message includes at least one of: a specific IP address; a specific flow label; or a specific DSCP.
18. The method of solution 17, wherein the second message enables a dual-connecting IAB node to deliver a DL data packet to its upper layer based on determining IP header information of the DL data packet matches at least one of: the specific IP address, the specific flow label, or the specific DSCP.
19. The method of solution 1, further comprising: transmitting, to the first IAB node, a third message wherein the third message is an RRC message or an F1 Application Protocol (FLAP) message.
20. The method of solution 19, wherein the third message includes a rewritten configuration.
21. The method of solution 19, wherein: the third message includes a BAP address and an indication.
22. The method of solution 19, wherein the third message includes a configuration of a BH RLC channel to be established and an indication.
23. The method of solution 19, wherein the third message includes a routing ID and an indication.
24. The method of solution 19, wherein the third message includes an F1-C transfer path configuration.
25. The method of solution 19, wherein the third message indicates whether the second network node supports IAB.
26. The method of solution 19, wherein the third message includes an identification of an F1-U tunnel.
27. The method of solution 19, wherein the third message includes an identification of a transport network layer (TNL) association, or a traffic type of the TNL association.

28. The method of solution 19, wherein the third message includes at least one of: a specific IP address; a specific flow label; or a specific DSCP.

29. The method of solution 28, wherein the third message enables a dual-connecting IAB node to deliver a DL data packet to its upper layer based on determining IP header information of the DL data packet matches at least one of: the specific IP address, the specific flow label, or the specific DSCP.

30. The method of solution 26, wherein the third message further includes at least one of: a routing ID associated with the F1-U tunnel, an IPv6 flow label associated with the F1-U tunnel, a DSCP associated with the F1-U tunnel, or an IP address associated with the F1-U tunnel.

31. The method of solution 27, wherein the third message further includes at least one of: a routing ID associated with the TNL association, an IPv6 flow label associated with the TNL association, a Differentiated Service Code Point (DSCP) associated with the TNL association, or an IP address associated with the TNL association.

32. The method of solution 1, further comprising: receiving, from the second network node or from a dual-connecting IAB node configured with two paths toward different IAB donors, an indication that the dual-connecting IAB-node has successfully connected to the second network node.

33. The method of solution 1, further comprising: transmitting, from a control plane of a CU of the first network node to a user plane of a CU of the first network node, a flow label or DSCP associated with an F1-U tunnel.

34. The method of solution 4, wherein the second message includes a rewritten configuration.

35. The method of solution 20 or 34, wherein the rewritten configuration includes a mapping between a first routing ID allocated by the first network node and a second routing ID allocated by the second network node.

36. The method of solution 20 or 34, wherein: the rewritten configuration includes a mapping between IP header information and a routing ID allocated by the second network node.

37. The method of solution 35, wherein a dual-connecting IAB node is enabled to: select an egress BH RLC channel based on the second routing ID or based on an ingress BH RLC channel, and submit a data packet to the selected egress channel.

38. The method of solution 36, wherein a dual-connecting IAB node is enabled to:

select an egress BH RLC channel based on the IP header information or based on an ingress BH RLC channel, and submit a data packet to the selected egress channel.

39. The method of solution 36, wherein the IP header information includes at least one of: a source IP address, a destination IP address, an IPv6 flow label, or a DSCP.

For example, the solutions listed below may be used by a network device for RLF scenarios as described herein (e.g., as described in FIGS. 4A-6 and Embodiments 5 and 6.)

40. A method of wireless communication (e.g., method 500 in FIG. 5) comprising: receiving, from a first integrated access backhaul (IAB) node at a second IAB node, an indication including one or more routing IDs associated with a radio link failure (RLF) (510); and performing an action based on the indication (520).

41. The method of solution 40, wherein the indication indicates the one or more routing IDs are unavailable.

42. The method of solution 41, wherein the action comprises:

designating, at the second IAB node, the one or more routing IDs as unavailable.

43. The method of solution 41, wherein the action comprises: designating a subset of the one or more routing IDs as available based on determining the subset can be rerouted; and designating the one or more routing IDs not in the subset as unavailable.

44. The method of solution 41, wherein the action comprises transmitting a second indication to a third IAB node, and the second indication includes the one or more routing IDs.

45. The method of solution 44, wherein the second indication indicates the one or more routing IDs are unavailable.

46. The method of solution 44, wherein a previous hop of the one or more routing IDs is the third IAB node.

47. The method of solution 40, wherein the indication indicates that the one or more routing IDs are available.

48. The method of solution 47, wherein the action comprises: designating, at the second IAB node, the one or more routing IDs as available.

49. The method of solution 47 wherein the action comprises transmitting a second indication to a third IAB node, and the second indication includes the one or more routing IDs.

50. The method of solution 49, wherein the second indication indicates the one or more routing IDs are available.

51. The method of solution 50, wherein a previous hop of the one or more routing IDs is the third IAB node.

52. A method of wireless communication (e.g., method 600 in FIG. 6) comprising: receiving, at an integrated access and backhaul (IAB) node from a first central unit (CU), a mapping rule (610); and changing a first routing ID in a backhaul adaptation protocol (BAP) protocol data unit (PDU) to a second routing ID based on the mapping rule (620).

53. The method of solution 52, wherein the changing the first routing ID is associated with at least one of the following: an inter-CU RLF recovery, an inter-CU migration, an inter-donor-DU migration, or an inter-donor-DU RLF recovery.

54. The method of solution 52, wherein the IAB node is configured for DC, the method further comprising: receiving an indication that the first routing ID is associated with an RLF or the first routing ID is unavailable.

55. The method of solution 52, wherein: the IAB node is configured for DC, the first routing ID is associated with a first DU connected to the first CU, and the second routing ID is associated with a second DU connected to a second CU.

56. The method of solution 52, wherein the changing the first routing ID is in response to: receiving, at the IAB node from a parent IAB node, an indication of a successful or ongoing migration of an upstream IAB node, wherein the migration is an inter-CU RLF recovery, an inter-CU migration, an inter-donor-DU migration, or an inter-donor-DU RLF recovery.

For example, the solutions listed below may be used by a network device for inter-donor redundancy scenarios as described herein (e.g., as described in FIGS. 2 and 3 and Embodiments 1-4.)

57. A method of wireless communication comprising: receiving, from a first network node configured to communicate with a first integrated access and backhaul (IAB) node, at a second network node, a first message including information relating to dual connectivity (DC).
58. The method of solution 57, wherein the first network node is a first IAB-donor and the second network node is a second IAB-donor.
59. The method of solution 58, wherein the first IAB-donor comprises a first IAB-donor-CU-CP, a first plurality of IAB-donor-CU-UPs, and a first plurality of IAB-donor-DUs, and the second IAB-donor comprises a second IAB-donor-CU-CP, a second plurality of IAB-donor-CU-UPs, and a second plurality of IAB-donor-DUs.
60. The method of solution 57, further comprising: transmitting, to the first network node, a second message that includes configuration information.
61. The method of solution 57, wherein the first message includes an identification of an F1-U tunnel.
62. The method of solution 57, wherein the first message includes an identification of a transport network layer (TNL) association, or a traffic type of the TNL association.
63. The method of solution 61, wherein the first message further includes at least one of: a routing ID associated with the F1-U tunnel, an indication that the F1-U tunnel is between a CU-user plane (CU-UP) and a distributed unit (DU) of a dual-connecting IAB-node, an IPv6 flow label associated with the F1-U tunnel, a Differentiated Service Code Point (DSCP) associated with the F1-U tunnel, or an IP address associated with the F1-U tunnel.
64. The method of solution 62, wherein the first message further includes at least one of: a routing ID associated with the TNL association, an indication, that the TNL association is between a CU-CP and a DU of a dual-connecting IAB-node, an IPv6 flow label associated with the TNL association, a Differentiated Service Code Point (DSCP) associated with the TNL association, or an IP address associated with the TNL association.
65. The method of solution 57, wherein the first message further includes at least one of: quality of service (QoS) information of a data radio bearer (DRB), or information relating to flows mapped to the DRB.
66. The method of solution 60, wherein the second message includes an identification of an F1-U tunnel.
67. The method of solution 60, wherein the second message includes an identification of a TNL association, or a traffic type of the TNL association.
68. The method of solution 66, wherein the second message further includes at least one of: a routing ID associated with the F1-U tunnel, an IPv6 flow label associated with the F1-U tunnel, a DSCP associated with the F1-U tunnel, or an IP address associated with the F1-U tunnel.
69. The method of solution 67, wherein the second message further includes at least one of: a routing ID associated with the TNL association, an IPv6 flow label associated with the TNL association, a Differentiated Service Code Point (DSCP) associated with the TNL association, or an IP address associated with the TNL association.
70. The method of solution 60, wherein the second message includes a backhaul adaptation protocol (BAP) address and an indication.
71. The method of solution 60, wherein the second message includes a configuration of a BH RLC channel to be established and an indication.
72. The method of solution 60, wherein the second message includes a routing ID and an indication.
73. The method of solution 60, wherein the second message includes at least one of: a specific IP address; a specific flow label; or a specific DSCP.
74. The method of solution 73, wherein the second message enables a dual-connecting IAB node to deliver a DL data packet to its upper layer based on determining IP header information of the DL data packet matches at least one of: the specific IP address, the specific flow label, or the specific DSCP.
75. The method of solution 57, further comprising: causing the first IAB node to receive a third message, wherein the third message is an RRC message or an F1 Application Protocol (FLAP) message.
76. The method of solution 75, wherein the third message includes a rewritten configuration.
77. The method of solution 75, wherein: the third message includes a BAP address and an indication.
78. The method of solution 75, wherein the third message includes a configuration of a BH RLC channel to be established and an indication.
79. The method of solution 75, wherein the third message includes a routing ID and an indication.
80. The method of solution 75, wherein the third message includes an F1-C transfer path configuration.
81. The method of solution 75, wherein the third message indicates whether the second network node supports IAB.
82. The method of solution 75, wherein the third message includes an identification of an F1-U tunnel.
83. The method of solution 75, wherein the third message includes an identification of a transport network layer (TNL) association, or a traffic type of the TNL association.
84. The method of solution 75, wherein the third message includes at least one of: a specific IP address; a specific flow label; or a specific DSCP.
85. The method of solution 84, wherein the third message enables a dual-connecting IAB node to deliver a DL data packet to its upper layer based on determining IP header information of the DL data packet matches at least one of: the specific IP address, the specific flow label, or the specific DSCP.
86. The method of solution 82, wherein the third message further includes at least one of: a routing ID associated with the F1-U tunnel, an IPv6 flow label associated with the F1-U tunnel, a DSCP associated with the F1-U tunnel, or an IP address associated with the F1-U tunnel.
87. The method of solution 83, wherein the third message further includes at least one of: a routing ID associated with the TNL association, an IPv6 flow label associated with the TNL association, a Differentiated Service Code Point (DSCP) associated with the TNL association, or an IP address associated with the TNL association.
88. The method of solution 57, further comprising: transmitting, from the second network node or from a dual-connecting IAB node configured with two paths toward different IAB donors, an indication that the dual-connecting IAB-node has successfully connected to the second network node.

89. The method of solution 57, further comprising: causing transmission from a control plane of a CU of the first network node to a user plane of a CU of the first network node, a flow label or DSCP associated with an F1-U tunnel.

90. The method of solution 60, wherein the second message includes a rewritten configuration.

91. The method of solution 76 or 90, wherein the rewritten configuration includes a mapping between a first routing ID allocated by the first network node and a second routing ID allocated by the second network node.

92. The method of solution 76 or 90, wherein: the rewritten configuration includes a mapping between IP header information and a routing ID allocated by the second network node.

93. The method of solution 91, wherein a dual-connecting IAB node is enabled to: select an egress BH RLC channel based on the second routing ID or based on an ingress BH RLC channel, and submit a data packet to the selected egress channel.

94. The method of solution 92, wherein a dual-connecting IAB node is enabled to: select an egress BH RLC channel based on the IP header information or based on an ingress BH RLC channel, and submit a data packet to the selected egress channel.

95. The method of solution 92, wherein the IP header information includes at least one of: a source IP address, a destination IP address, an IPv6 flow label, or a DSCP.

For example, the solutions listed below may be used by a network device for RLF scenarios as described herein (e.g., as described in FIGS. 4A-6 and Embodiments 5 and 6.)

96. A method of wireless communication comprising: transmitting, from a first integrated access backhaul (IAB) node to a second IAB node, an indication including one or more routing IDs associated with a radio link failure (RLF); wherein the indication enables the second IAB node to perform an action based on the indication.

97. The method of solution 96, wherein the indication indicates the one or more routing IDs are unavailable.

98. The method of solution 97, wherein the action comprises: designating, at the second IAB node, the one or more routing IDs as unavailable.

99. The method of solution 97, wherein the action comprises: designating a subset of the one or more routing IDs as available based on determining the subset can be rerouted; and designating the one or more routing IDs not in the subset as unavailable.

100. The method of solution 97, wherein the action comprises transmitting a second indication to a third IAB node, and the second indication includes the one or more routing IDs.

101. The method of solution 100, wherein the second indication indicates the one or more routing IDs are unavailable.

102. The method of solution 100, wherein a previous hop of the one or more routing IDs is the third IAB node.

103. The method of solution 96, wherein the indication indicates that the one or more routing IDs are available.

104. The method of solution 103, wherein the action comprises: designating, at the second IAB node, the one or more routing IDs as available.

105. The method of solution 103, wherein the action comprises transmitting a second indication to a third IAB node, and the second indication includes the one or more routing IDs.

106. The method of solution 105, wherein the second indication indicates the one or more routing IDs are available.

107. The method of solution 106, wherein a previous hop of the one or more routing IDs is the third IAB node.

108. A method of wireless communication comprising: transmitting, to an integrated access and backhaul (IAB) node from a first central unit (CU), a mapping rule; and causing the IAB node to change a first routing ID in a backhaul adaptation protocol (BAP) protocol data unit (PDU) to a second routing ID based on the mapping rule.

109. The method of solution 108, wherein the causing the IAB node to change the first routing ID is associated with at least one of the following: an inter-CU RLF recovery, an inter-CU migration, an inter-donor-DU migration, or an inter-donor-DU RLF recovery.

110. The method of solution 108, wherein the IAB node is configured for DC, the method further comprising: receiving an indication that the first routing ID is associated with an RLF or the first routing ID is unavailable.

111. The method of solution 108, wherein: the IAB node is configured for DC, the first routing ID is associated with a first DU connected to the first CU, and the second routing ID is associated with a second DU connected to a second CU.

112. The method of solution 108, wherein the causing the IAB node to change the first routing ID is in response to: causing a parent IAB node to transmit to the IAB node an indication of a successful or ongoing migration of an upstream IAB node, wherein the migration is an inter-CU RLF recovery, an inter-CU migration, an inter-donor-DU migration, or an inter-donor-DU RLF recovery.

For example, the solutions listed below may an apparatus or computer readable medium for implementing UE configuration as described herein.

113. A wireless apparatus comprising a processor configured to implement the method of any of solutions 1 to 112.

114. A computer readable medium having code stored thereon, the code when executed by a processor, causing the processor to implement a method recited in any of solutions 1 to 112.

In some embodiments, a base station may be configured to implement some or all of the base station side techniques described in the present document.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication comprising:

transmitting, by a first integrated access and backhaul (IAB) donor central unit (CU) configured to communicate with an IAB node, a first message including information relating to dual connectivity (DC) to a second IAB donor CU;

receiving, at the first IAB donor CU, a second message that includes configuration information of a backhaul (BH) channel to be established, wherein the second message enables the IAB node that is configured with two paths toward the first IAB donor CU and the second IAB donor CU to deliver a data packet to an upper layer above a radio link control (RLC) channel upon determining that an Internet Protocol (IP) header information of the data packet matches at least one of: a specific IP address, a specific flow label, or a specific Differentiated Service Code Point (DSCP); and receiving, at the first IAB donor CU from the second IAB donor CU or from the IAB node, an indication that the first IAB node has successfully connected to the second IAB donor CU.

2. The method of claim 1, wherein the first message comprises an Xn Application Protocol (XnAP) message, wherein the first message comprises at least one of: an identity of the IAB node, an identity of a descendant node of the IAB node, an identity of a user equipment, an identity of an F1-U tunnel, an identity of a Transport Network Layer (TNL) association, an F1-C Traffic Type of each TNL association, or F1-U tunnel related information including at least one of data radio bearer (DRB) quality of services (QoS) information or information of Flows Mapped to the DRB.

3. The method of claim 1, wherein the second message includes a second XnAP message that comprises at least one of: an identity of the IAB node, an identity of a descendant node of the IAB node, an identity of a user equipment, an identity of an F1-U tunnel, an identity of a Transport Network Layer (TNL) association, an F1-C Traffic Type of each TNL association, a routing identifier of each F1-U tunnel for F1-U traffic to be migrated, a routing identifier of each TNL association for F1-C traffic to be migrated, a rewritten configuration, a topology identifier, an IP address of each F1-U tunnel, an IP address of each TNL association, an IP address of each traffic type, IP addresses allocated at the second IAB donor CU, an IPv6 flow label or DSCP of each F1-U tunnel, an IPv6 flow label or DSCP of each TNL association, or a backhaul adaptation protocol (BAP) address used for the IAB node.

4. The method of claim 3, wherein the rewritten configuration includes a mapping between IP information associated with the first IAB donor CU and a second routing identifier allocated by the second IAB donor CU.

5. The method of claim 1, further comprising:

transmitting, from a control plane of the first IAB CU to a user plane of the first IAB CU, a flow label or DSCP associated with an F1-U tunnel.

6. A method of wireless communication, comprising:

transmitting, by an integrated access and backhaul (IAB) node, a measurement report to a first IAB donor central unit (CU) via a first IAB donor distributed unit (DU); and receiving, by the IAB node and from the first IAB donor CU, a set of backhaul configurations and an indication, wherein the indication informs the IAB node that the set of backhaul configurations is used for packet forwarding along a second path between the IAB node and a second IAB donor CU, wherein the set of backhaul configurations comprises one or more routing identifiers indicating that a packet with one of the one or more routing identifiers is delivered to an upper layer of the IAB node above a radio link control (RLC) channel.

7. The method of claim 6, wherein the measurement report is based on a measurement configuration received from the first IAB donor CU.

8. The method of claim 6, wherein the set of backhaul configurations comprises at least one of: a rewritten configuration, a bearer mapping and route configuration, one or more routing identifiers, an IP address of an F1-U tunnel to be migrated, or an IP address of a TNL association to be migrated.

9. The method of claim 6, comprising:
receiving, by the IAB node, an update of the set of backhaul configurations from the first IAB donor CU.

10. The method of claim 6, comprising:
selecting an egress backhaul channel based on a routing identifier, an IP header information, or an ingress backhaul channel, and
submitting a data packet to the selected egress channel.

11. An apparatus implemented as a first integrated access and backhaul (IAB) donor central unit (CU), comprising one or more processors configured to:
transmit a first message including information relating to dual connectivity (DC) to a second IAB donor CU;
receiving a second message that includes configuration information of a backhaul (BH) channel to be established,
wherein the second message enables an IAB node that is configured with two paths toward the first IAB donor CU and the second IAB donor CU to deliver a data packet to an upper layer above a radio link control (RLC) channel upon determining that an Internet Protocol (IP) header information of the data packet matches at least one of: a specific IP address, a specific flow label, or a specific Differentiated Service Code Point (DSCP); and
receive, at the first IAB donor CU from the second IAB donor CU or from the IAB node, an indication that the IAB node has successfully connected to the second IAB donor CU.

12. The apparatus of claim 11, wherein the first message comprises an Xn Application Protocol (XnAP) message, wherein the first message comprises at least one of: an identity of the IAB node, an identity of a descendant node of the IAB node, an identity of a user equipment, an identity of an F1-U tunnel, an identity of a Transport Network Layer (TNL) association, an F1-C Traffic Type of each TNL association, or F1-U tunnel related information including at least one of data radio bearer (DRB) quality of services (QoS) information or information of Flows Mapped to the DRB.

13. The apparatus of claim 11, wherein the second message includes a second XnAP message that comprises at least one of: an identity of the IAB node, an identity of a descendant node of the IAB node, an identity of a user equipment, an identity of an F1-U tunnel, an identity of a Transport Network Layer (TNL) association, an F1-C Traffic Type of each TNL association, a routing identifier of each F1-U tunnel for F1-U traffic to be migrated, a routing identifier of each TNL association for F1-C traffic to be migrated, a rewritten configuration, a topology identifier, an IP address of each F1-U tunnel, an IP address of each TNL association, an IP address of each traffic type, IP addresses allocated at the second IAB donor CU, an IPv6 flow label or DSCP of each F1-U tunnel, an IPv6 flow label or DSCP of each TNL association, or a backhaul adaptation protocol (BAP) address used for the IAB node.

14. The apparatus of claim 13, wherein the rewritten configuration includes a mapping between IP information associated with the first IAB donor CU and a second routing identifier allocated by the second IAB donor CU.

15. The apparatus of claim 11, further comprising:
transmitting, from a control plane of the first IAB CU to a user plane of the first IAB CU, a flow label or DSCP associated with an F1-U tunnel.

16. An apparatus implemented as an integrated access and backhaul (IAB) node, comprising one or more processors that are configured to:
transmit a measurement report to a first IAB donor central unit (CU) via a first IAB donor distributed unit (DU); and
receive, from the first IAB donor CU, a set of backhaul configurations and an indication, wherein the indication informs the IAB node that the set of backhaul configurations is used for packet forwarding along a second path between the IAB node and a second IAB donor CU,
wherein the set of backhaul configurations comprises one or more routing identifiers indicating that a packet with one of the one or more routing identifiers is delivered to an upper layer of the IAB node above a radio link control (RLC) channel.

17. The apparatus of claim 16, wherein the measurement report is based on a measurement configuration received from the first IAB donor CU.

18. The apparatus of claim 16, wherein the set of backhaul configurations comprises at least one of: a rewritten configuration, a bearer mapping and route configuration, one or more routing identifiers, an IP address of an F1-U tunnel to be migrated, or an IP address of a TNL association to be migrated.

19. The apparatus of claim 16, wherein the one or more processors are configured to:
receive an update of the set of backhaul configurations from the first IAB donor CU.

20. The apparatus of claim 16, wherein the one or more processors are configured to:
select an egress backhaul channel based on a routing identifier, an IP header information, or an ingress backhaul channel, and
submit a data packet to the selected egress channel.

* * * * *